US010565562B2

(12) United States Patent
Saha et al.

(10) Patent No.: US 10,565,562 B2
(45) Date of Patent: Feb. 18, 2020

(54) HASHING QUERY AND JOB POSTING FEATURES FOR IMPROVED MACHINE LEARNING MODEL PERFORMANCE

(71) Applicant: Microsoft Technology Licensing, LLC, Redmond, WA (US)

(72) Inventors: Ankan Saha, San Francisco, CA (US); Dhruv Arya, Sunnyvale, CA (US); Shahdad Irajpour, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 15/658,683

(22) Filed: Jul. 25, 2017

(65) Prior Publication Data
US 2019/0034882 A1 Jan. 31, 2019

(51) Int. Cl.
*G06Q 10/10* (2012.01)
*G06Q 50/00* (2012.01)
*G06N 20/00* (2019.01)
*G06F 16/951* (2019.01)

(52) U.S. Cl.
CPC ....... *G06Q 10/1053* (2013.01); *G06F 16/951* (2019.01); *G06N 20/00* (2019.01); *G06Q 50/01* (2013.01)

(58) Field of Classification Search
None
See application file for complete search history.

(56) References Cited

U.S. PATENT DOCUMENTS

| 10,235,403 | B2* | 3/2019 | Rossi | G06Q 30/02 |
|---|---|---|---|---|
| 2007/0136457 | A1 | 6/2007 | Dai et al. | |
| 2010/0114654 | A1 | 5/2010 | Lukose et al. | |
| 2013/0198099 | A1* | 8/2013 | Hyder | G06Q 10/10 705/321 |
| 2014/0244612 | A1* | 8/2014 | Bhasin | H04L 67/22 707/706 |

(Continued)

OTHER PUBLICATIONS

Hang, et al.,"Gimix: Generalized linear mixed models for large-scale response prediction",In Proceedings of the >2nd ACM SIGKDD International Conference on Knowledge Discovery and Data Mining,Aug. 13, 2016, pp. 1-10 (Year: 2016).*

(Continued)

*Primary Examiner* — Andrew B Whitaker
(74) *Attorney, Agent, or Firm* — Schwegman Lundberg & Woessner, P.A.

(57) ABSTRACT

In an example, a first hash function is performed on job posting features extracted from a job posting to obtain hashed job posting features. The hashed job posting features are stored in a forward-index corresponding to the job posting in the database. When a job search query is received from a first member of a social networking service, job search query features are extracted from the job search query and a second hash function is performed on the job search query features. The hashed job posting features and the hashed job search query features are fed to a job posting result ranking model trained via a machine learning algorithm to compare the hashed job posting features to the hashed job search query features to generate an application likelihood score indicating a likelihood that the first member will apply for a job corresponding to the job posting.

20 Claims, 9 Drawing Sheets

(56) References Cited

U.S. PATENT DOCUMENTS

| | | |
|---|---|---|
| 2014/0282098 A1 | 9/2014 | McConnel |
| 2014/0372350 A1 | 12/2014 | Armon-Kest et al. |
| 2015/0127565 A1* | 5/2015 | Chevalier .............. G06Q 10/00 705/319 |
| 2018/0181915 A1* | 6/2018 | Chen ..................... G06F 16/353 |
| 2019/0019157 A1 | 1/2019 | Saha et al. |
| 2019/0197013 A1 | 6/2019 | Chen et al. |
| 2019/0197422 A1 | 6/2019 | Chen et al. |

OTHER PUBLICATIONS

"Non Final Office Action Issued in U.S. Appl. No. 15/648,798", dated May 16, 2019, 53 Pages.

Agichtein, et al., "Improving web search ranking by incorporating user behavior information",In Proceedings of the 29th Annual International ACM SIGIR Conference on Research and Development in Information Retrieval, Aug. 6, 2006, pp. 19-26.

Brownlee, Jason,"Logistic Regression for Machine Learning", Retrieved From: https://machinelearningmastery.com/logistic-regression-for-machine-learning/,2016, 6 Pages.

Kalwani, Manohar,"Maximum likelihood estimation of zero-order models given variable numbers of purchases per household", In Journal of Marketing Research, vol. 17, No. 4 (1980), pp. 547-551.

Lebanon,Guy, "Making Your Feed More Relevant—Part 2: Relevance Models and Features",Retrieved From: https://engineering.linkedin.com/blog/2016/03/making-your-feed-more-relevant-part-2-relevance-models-and-fea,2016, 5 Pages.

Ogilive,Paul,"Open Sourcing Photon ML: LinkedIn's Scalable Machine Learning Library for Spark",Retrieved From: https://engineering.linkedin.com/blog/2016/06/open-sourcing-photon-ml, 2016, 5 Pages.

Saha, et al.,"Generalized mixed effect models for personalizing job search", In Proceedings of the 40th International ACM SIGIR Conference on Research and Development in Information Retrieval, Aug. 7, 2017, 4 Pages.

Birgelen, et al.,"Effectiveness of corporate employment web sites: Flow content and form influence intentions to apply", In International Journal of Manpower 29.8 ,Nov. 14, 2008, pp. 731-751.

Wang, et al.,"Personalized ranking model adaptation for web search", The 36th International ACM SIGIR conference on research and development in Information Retrieval, SIGIR '13, Jul. 28, 2013,10 Pages.

Yu, et al.,"Scalable coordinate descent approaches to parallel matrix factorization for recommender systems",In Proceedings of IEEE 12th International Conference on Data Mining, Dec. 10, 2012, pp. 765-774.

Zhang, et al.,"A research of job recommendation system based on collaborative filtering",In Proceedings of Seventh International Symposium on Computational Intelligence and Design,Dec. 13, 2014, pp. 533-538.

Zhang, et al.,"Gimix: Generalized linear mixed models for large-scale response prediction",In Proceedings of the 22nd ACM SIGKDD International Conference on Knowledge Discovery and Data Mining,Aug. 13, 2016, pp. 1-10.

\* cited by examiner

US 10,565,562 B2

HASHING QUERY AND JOB POSTING FEATURES FOR IMPROVED MACHINE LEARNING MODEL PERFORMANCE

TECHNICAL FIELD

The present disclosure generally relates to technical problems encountered in personalizing job searches on computer networks. More specifically, the present disclosure relates to the hashing of query and job posting features for improved machine learning model performance.

BACKGROUND

The rise of the Internet has occasioned two disparate phenomena: the increase in the presence of social networks, with their corresponding member profiles visible to large numbers of people, and the increase in the use of these social networks to perform searches for jobs that have been posted on or linked to by the social networks.

A technical problem encountered by social networking services in managing online job searches is that determining how to serve the most appropriate and relevant job results with minimal delay becomes significantly challenging as the number of sources and volume of job opportunities via the social networking services grows at an unprecedented pace.

Personalization of job search results is also preferential. For example, when a user searches for a query like "software engineer," depending on the skills, background, experience, location, and other factors about the user, the ranked list of results can be drastically different. Thus, for example, a person skilled in machine learning would see a very different set of job results compared to someone specializing in hardware or computer networks.

Historically, algorithms to rank job search results in response to a query have heavily utilized text and entity-based features extracted from the query and job postings to derive a global ranking. However, when such global ranking algorithms are modified to improve certain queries, other queries tend to become degraded. Specifically, the queries that often become degraded are those where personalization is desired, such as in the "software engineer" example provided above. Given the prevalence of such job search queries, it would be beneficial to have a technical solution for providing highly relevant job posting results even if the global ranking model cannot generalize well for these types of queries.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
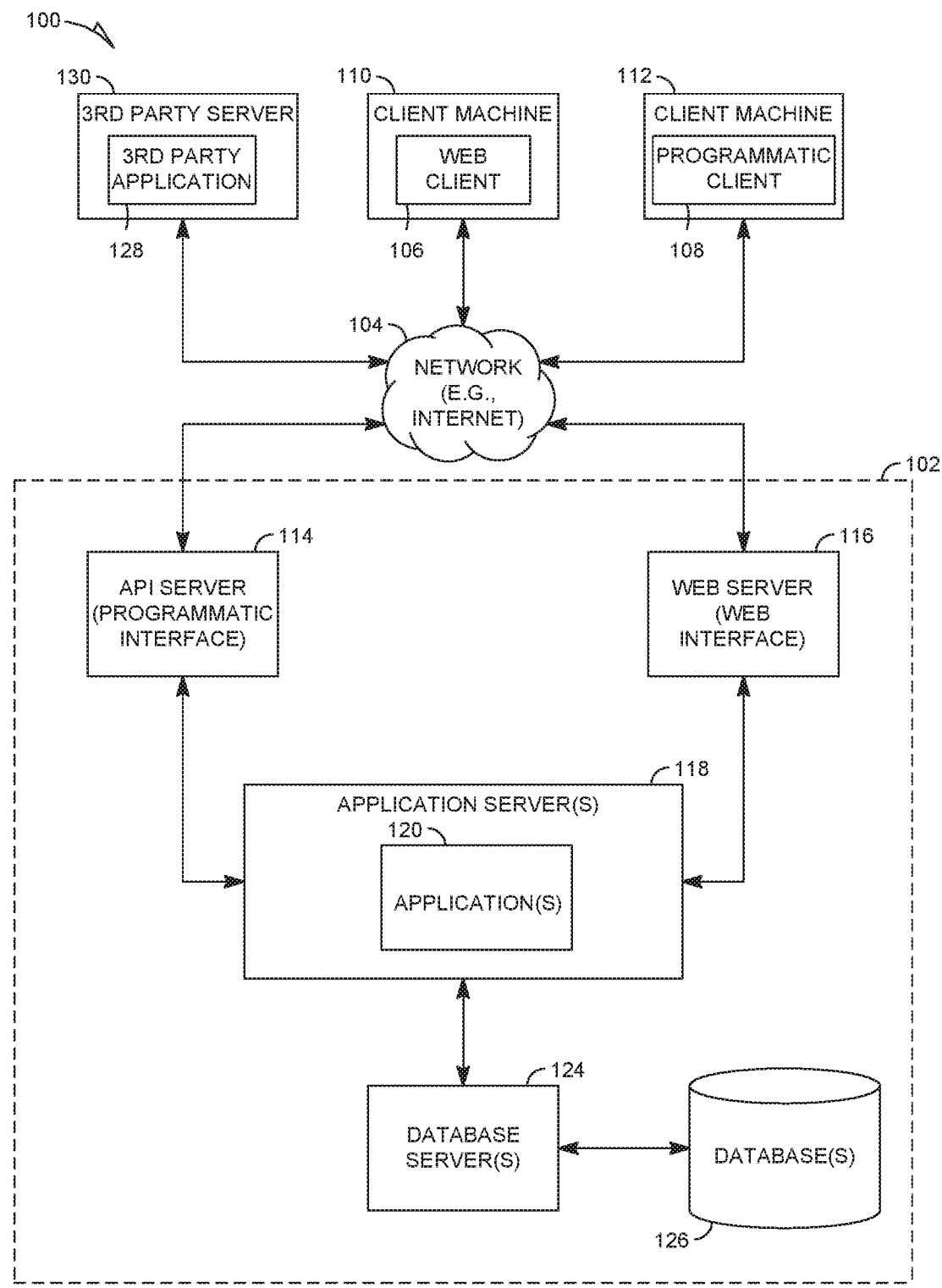
FIG. 1 is a block diagram illustrating a client-server system, in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a system is provided wherein a machine learning model utilizes features from both job search results as well as queries to predict a likelihood of a member expressing interest in a job search result, such as by applying to the corresponding job. This likelihood can be used, for example, to aid in ranking job search results for members performing searches. Furthermore, a hashing functionality may be used to hash the features from the job search results and hash the features from the queries. This hashing allows the features to be stored in a more efficient manner, and also allows the machine learning model to perform its runtime evaluation more quickly.

In an example embodiment, generalized linear mixed effect models (GLMix) are used to improve job search results. In the context of job searching, one key aspect is to show the best jobs to a user based on his or her query, according to some measure. In one example embodiment, this measure may be quantified as the likelihood of member m applying for job j if provided as a result when he or she enters the query q, measured by the binary response $y_{mjs}$, $s_j$ denotes the feature vector of job j, which includes features extracted from the job posting, such as the job title, summary, location, desired skills, and experience needed. $x_{mjq}$ represents the overall feature vector for the (m, j, q) triple, which can include member, job, query, and associated context features and any combination thereof.

Specifically, a generalized mixed effect model is trained using sample job posting results and sample member data, including information on what queries produced the sample job posting results and an indication that particular members applied to particular sample job posting results (or otherwise expressed interest in the results). The generalized mixed effect model is then trained on the space of job-features in addition to a global model. This allows finer signals in the training data to be captured, thus allowing for better differentiation on how the presence of a particular job skill should generate job posting results as opposed to another skill.

When scoring is performed using a per-query model such as GLMix, a number of feature/coefficient pairs are passed-in with each search-request. In particular, GLMix's per-query score may be calculated as a sum. For each document (job search result) feature, if the feature is among those passed-in with the request, the corresponding coefficient is added to the sum.

In an example embodiment, the collection of features used in the calculation of the per-query score (whether using GLMix or not) is stored in a designated field of a forward-index for each job posting.

In an example embodiment, it is recognized that the efficiency of calculating a per-query score heavily relies on the format by which the corresponding features are stored in in the forward-index and retrieved during scoring.

Features passed-in with the search request as well as those stored in a job postings forward-index are a series of strings. However, storing and processing the features as strings is inefficient. Thus, in an example embodiment, a hashing function is applied to the features. The per-query model is passed-in with the request as a number of hash/coefficient pairs. Then features' hashes (integers or longs) are stored in the forward index and used during the processing of calculating the score.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
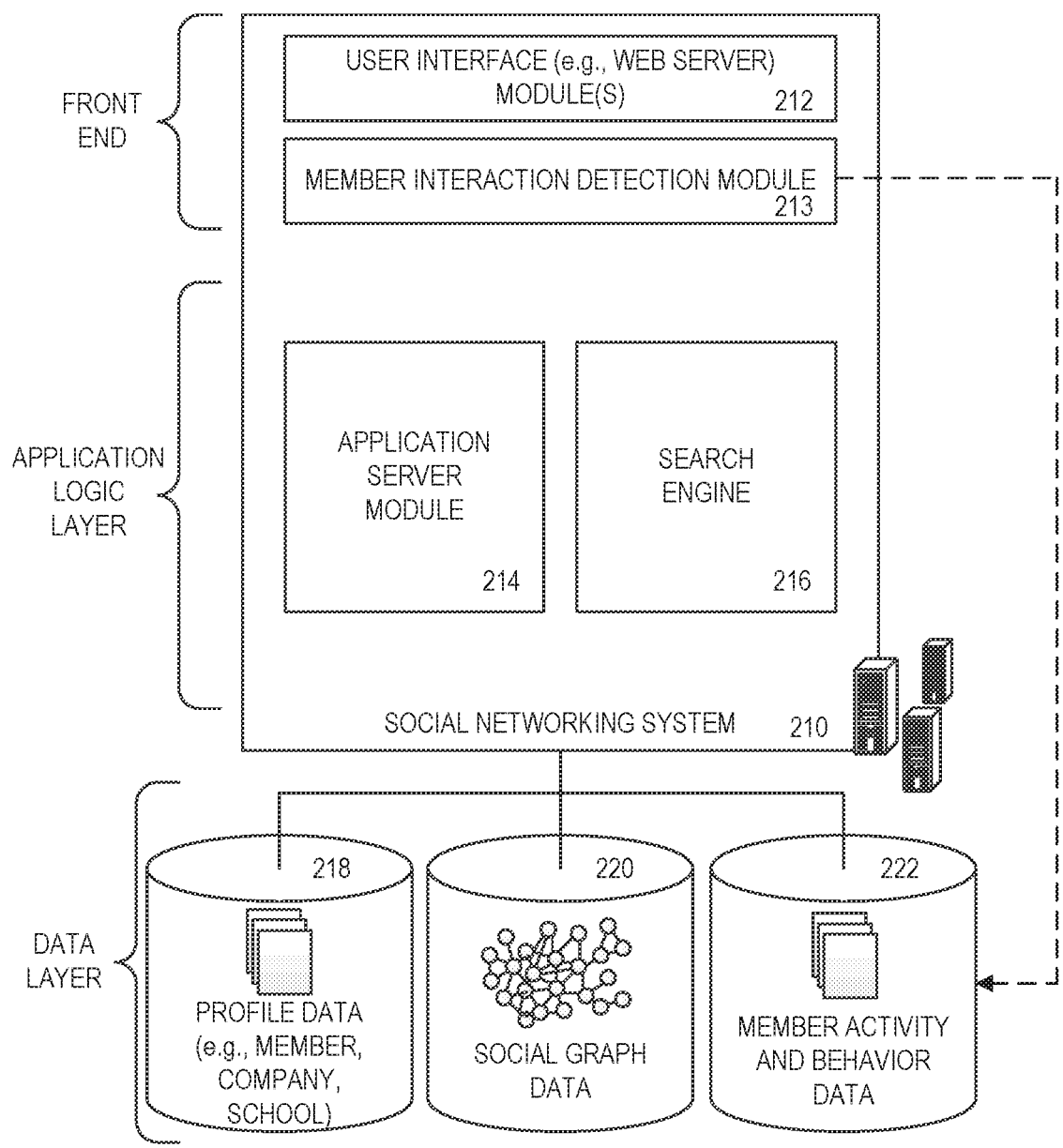
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.) Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view a user interface on a mobile device or on desktop software) is within the scope of the present disclosure.

Figure 3:
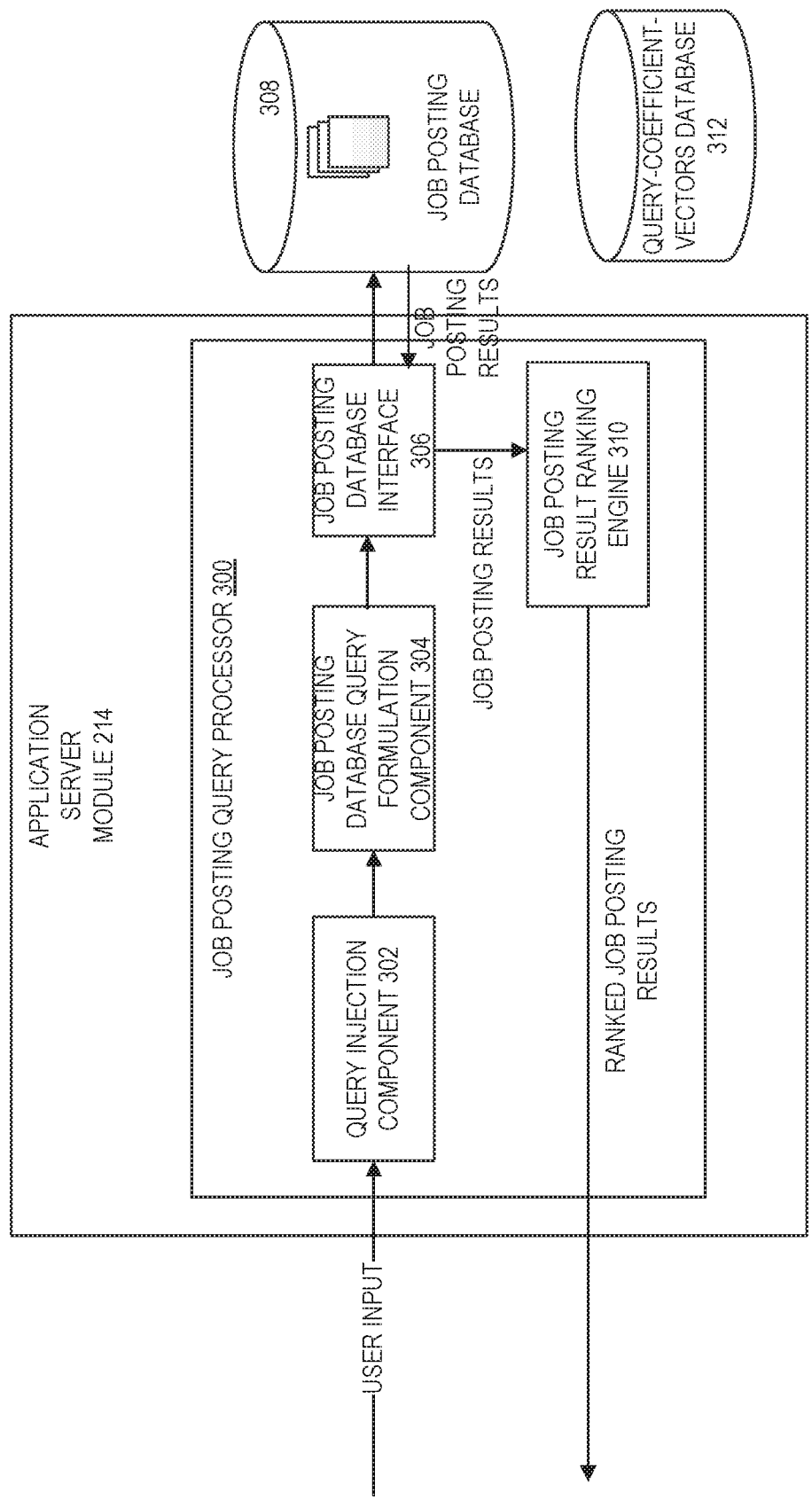
FIG. 3 is a block diagram illustrating application server module of FIG. 2 in more detail, in accordance with an example embodiment.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on, FIG. 3 is a block diagram illustrating an application server module 214 of FIG. 2 in more detail, in accordance with an example embodiment. While in many embodiments the application server module 214 will contain many subcomponents used to perform various different actions within the social networking system, in FIG. 3 only those components that are relevant to the present disclosure are depicted. A job posting query processor 300 comprises a query injection component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other members or entities, and the like.

This "query" may be sent to a job posting database query formulation component 304, which formulates an actual job posting database query, which will be sent via a job posting database interface 306 to job posting database 308. Job posting results responsive to this job posting database query may then be sent to the job posting result ranking engine 310, again via the job posting database interface 306. The job posting result ranking engine 310 then ranks the job posting results and sends the ranked job posting results back to the user interface for display to the user.

Job posting database 308 may store the job postings in a forward-index system, with each job posting having its own forward index. As described earlier, in one example embodiment, document (i.e., job posting) features are stored in the forward index for the corresponding document, in a hash format. Additionally, per-query features are stored as per-query query-coefficient vectors and fetched as needed during model evaluation time. A specialized query-coefficient-vectors database 312 may be constructed to store these vectors.

Figure 4:
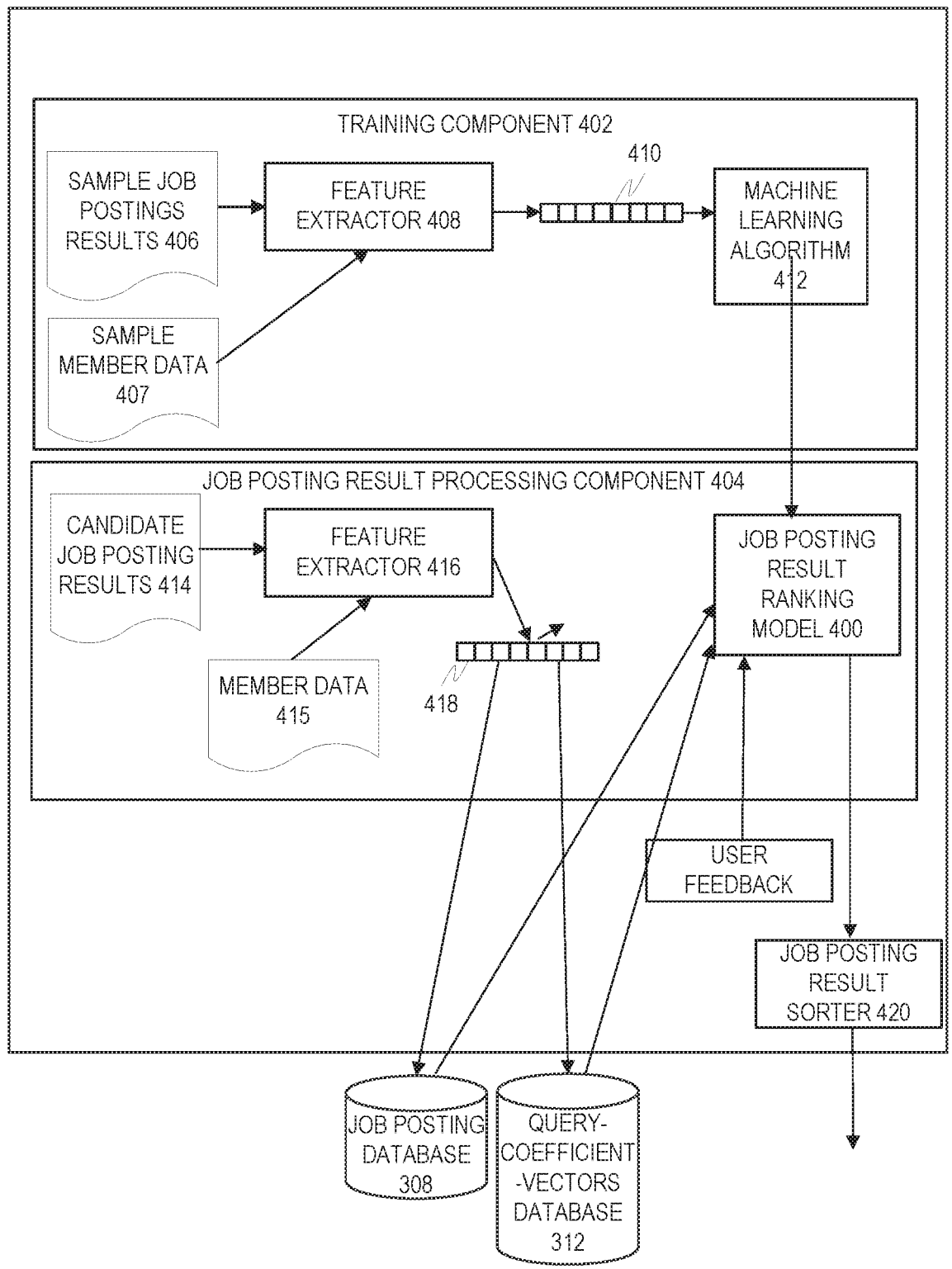
FIG. 4 is a block diagram illustrating job posting result ranking engine of FIG. 3 in more detail, in accordance with an example embodiment.

FIG. 4 is a block diagram illustrating the job posting result ranking engine 310 of FIG. 3 in more detail, in accordance with an example embodiment. The job posting result ranking engine 310 may use machine learning techniques to learn a job posting result ranking model 400, which can then be used to rank actual job posting results from the job posting database 308.

The job posting result ranking engine 310 may comprise a training component 402 and a job posting result processing component 404. The training component 403 feeds sample job postings results 406 and sample member data 407 into a feature extractor 408 that extracts one or more features 410 for the sample job postings results 406 and sample member data 407. The sample job postings results 406 may each include job postings results produced in response to a particular query as well as one or more labels, such as a job posting application likelihood score, which is a score indicating a probability that a member with a corresponding sample member data 407 will apply for the job associated with the corresponding sample job postings result 406.

Sample member data 407 may include, for example, a history of job searches and resulting expressions of interest (such as clicking on job posting results or applications to corresponding jobs) in particular job posting results for particular members. In some example embodiments, sample member data 407 can also include other data relevant for personalization of the query results to the particular member, such as a member profile for the member or a history of other member activity.

A machine learning algorithm 412 produces the job posting result ranking model 400 using the extracted features 410 along with the one or more labels. In the job posting result processing component 404, candidate job postings results 414 resulting from a particular query are fed to a feature extractor 416 along with candidate member data 415. The feature extractor 416 extracts one or more features 418 from the candidate job postings results 414 and candidate member data 415.

Figure 5:
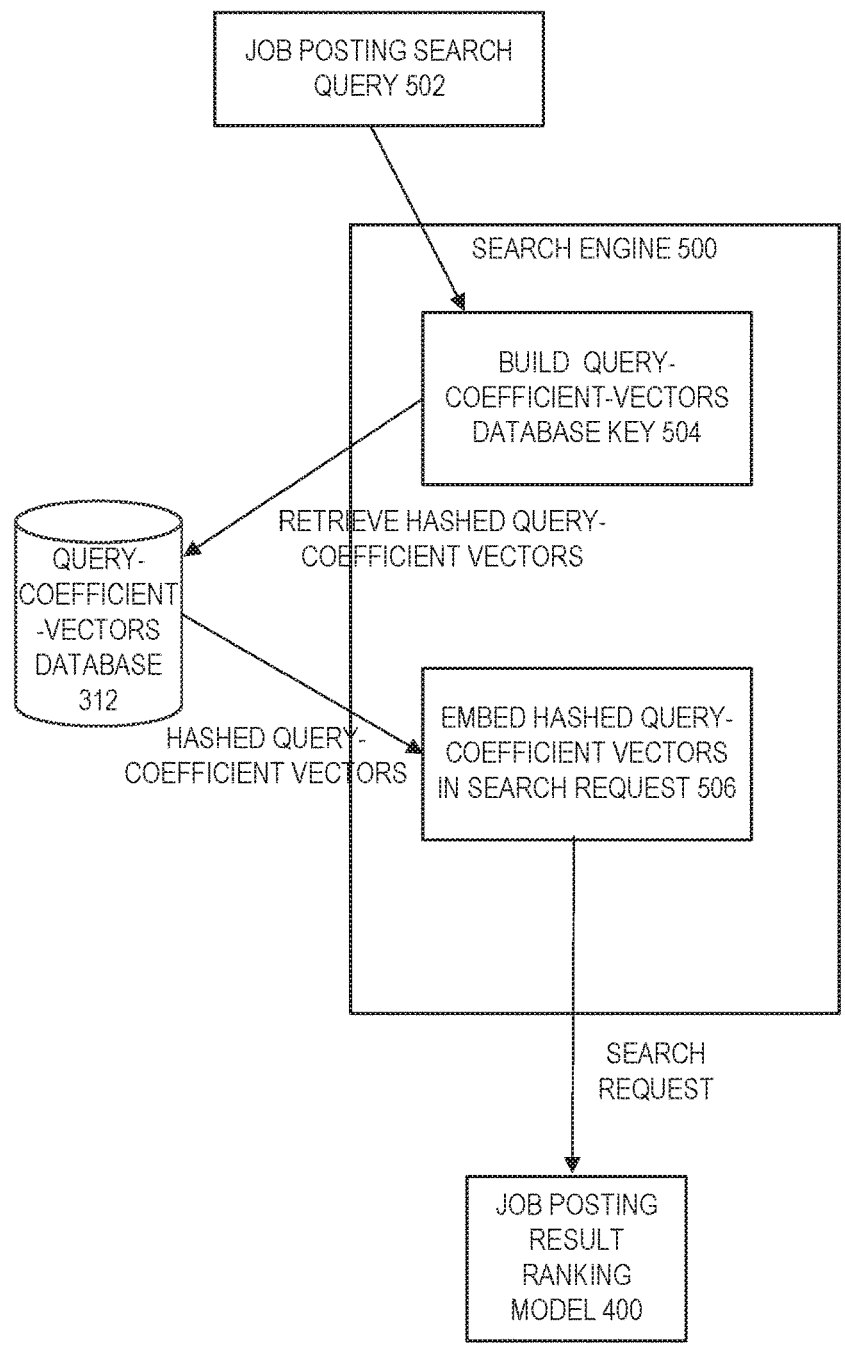
FIG. 5 is a block diagram illustrating a search engine, in accordance with an example embodiment.

As described above, the features 418 may include both query features and job posting features. Query features may be embedded as query-coefficient vectors, hashed, and then stored in query-coefficient-vectors database 312. At runtime, the job posting result ranking model 400 may retrieve the hashed query-coefficient vectors corresponding to the current job search query and use them in its comparison with hashed job posting features. In one example embodiment, this may be accomplished via a search engine (not pictured). FIG. 5 is a block diagram illustrating a search engine 500 in accordance with an example embodiment. Here, the search engine 500 receives a job posting search query 502 and builds a query-coefficient-vectors database key 504 for the job posting search query 502. This key 504 is then used to retrieve the corresponding query-coefficient-vector(s) from the query-coefficient-vectors database 312. At 506, the search engine 500 may then embed the retrieved query-coefficient-vectors (still in hashed format) in the search request, which is then utilized by the job posting result ranking model 400 to rank relevant job posting results.

Figure 6:
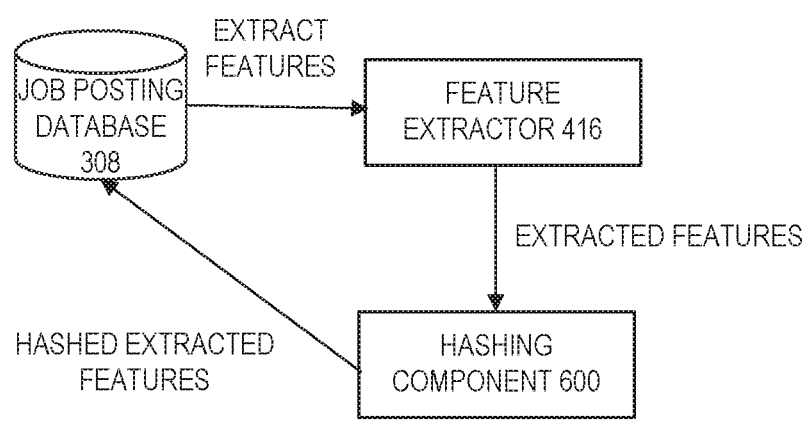
FIG. 6 is a block diagram illustrating embedding of document features in a forward index, in accordance with an example embodiment.

Referring back to FIG. 4, job posting features may be hashed and stored in forward-indexes for corresponding job postings in job postings database 308. FIG. 6 is a block diagram illustrating embedding of document features in a forward index, in accordance with an example embodiment. Here, job postings are retrieved from the job posting database 308 and features are extracted from the job postings by feature extractor 416. The hashing component 600 then hashes the extracted features and stores them back in the corresponding forward-indexes in job posting database 308.

Notably, in an example embodiment, the process depicted in FIG. 6 may only occur in an offline manner, whereas the process depicted in FIG. 5 may occur in an offline manner, at runtime, and/or on demand.

Additionally, in some example embodiments, the process depicted in FIG. 6 may be also used to store other features in addition to pure document features. This may include, for example, member features of members who have previously expressed interested in (e.g., applied for) the corresponding job.

In an example embodiment, the hashing function used may be, for example, the CRC32 hashing function.

Referring back to FIG. 4, the job posting result ranking model 400 outputs a job posting application likelihood score for each candidate job posting result for the particular query.

This job posting application likelihood score for each candidate job posting result may then be passed to a job posting result sorter 420, which may sort the candidate job postings results 414 based on their respective job posting application likelihood scores.

It should be noted that the job posting result ranking model 400 may be periodically updated via additional training and/or user feedback. The user feedback may be either feedback from members performing searches or from companies corresponding to the job postings. The feedback may include an indication about how successful the job posting result ranking model 400 is in predicting member interest in the job posting results presented.

The machine learning algorithm 412 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

It should be noted that one technical issue with utilizing a Learning To Rank (LTR) metric using coordinate assent as part of the machine learning algorithm 412 is that the global features similar to $x_{mjq}$ do not capture relationships between individual queries and jobs. This technical problem can be overcome by obtaining a notion of affinity of the query string with the job-features associated with the job posting. While this can be achieved by introducing interaction features between each query string and job posting feature, that would make the feature space prohibitively expensive and training the model very difficult.

In an example embodiment, the notion of affinity of the query string with the job features associated with the job posting can be obtained by using one or more mixed effect models, which can exploit the interaction of each query with the job features explicitly.

In an example embodiment, a GLMix model is used to predict the probability of member in applying for job j based on query q using logistic regression. This GLMix model may be, for example:

$$g(E[y_{mjg}]) = x'_{mjq}b + s'_{j\beta q}$$

$$\text{where } g(E[y_{mjq}]) = \log \frac{E[y_{mjq}]}{1 - E[y_{mjq}]}$$

link function, b is the global coefficient vector (also called fixed effect coefficients) and $\beta_q$ are the coefficient vectors specific to query q, called random effects coefficients, which capture query q's association or relationship with different job functions.

Note that in some example embodiments, it is also possible to have similar random effects coefficients $\alpha_m$ or $\gamma_j$ on a per-member or per-job basis, which can then be combined with features on the job-query or member-query spaces, respectively. However, with increasingly large numbers of members or jobs, this can make such a model prohibitively expensive to be applied in production, as the final model would have a different set of coefficients for each member and each job and would incur severe latency while generating the scores for a triple at run-time. Applying the random effects via a per-query model on the job-features in conjunction with the global model allows the system to improve the baseline global model significantly in terms of both offline metrics as well as application rates in production. The member features tend to be mostly static and thus do not contribute much when added into the per-query model.

In an example embodiment, the model described above is optimized via alternating optimization using parallelized coordinate descent. Here, the system may alternately optimize for the global features and the per-query features for each query while holding all other variables fixed. Specifically, in one example embodiment, the optimization problems for updating the fixed effects b and random effects F are as follows:

$$b = \arg\max_b \left\{ \log p(b) + \sum_{n \in \Omega} \log p(y_n | s_n - x'_n b^{old} + x'_n b) \right\}$$

$$\gamma_{rl} = \arg\max_{\gamma_{rl}} \left\{ \log p(\gamma_{rl}) + \sum_{n | i(r,n)=l} \log p(y_n | s_n - z'_{m\gamma_{rl}}^{old} + z'_{m\gamma_{rl}}) \right\}$$

Incremental updates are performed for $s = \{s_n\} n \in \Omega$ for computational efficiency. More specifically, when the fixed effects b get updated, the following equation is used:

$$s_n^{new} = s_n^{old} - x'_n b^{old} + x'_n b^{new}$$

and when the random effects F get updated, the following equation is used:

$$s_n^{new} = s_n^{old} - x'_m \gamma_{(r,n)}^{old} + x'_m \gamma_{r,i(r,n)}^{new}$$

As described above, the training component 402 may operate in an offline manner to train the job posting result ranking model 400. However, the job posting result processing component 404 may be designed to operate in either an offline manner or an online manner.

Figure 7:
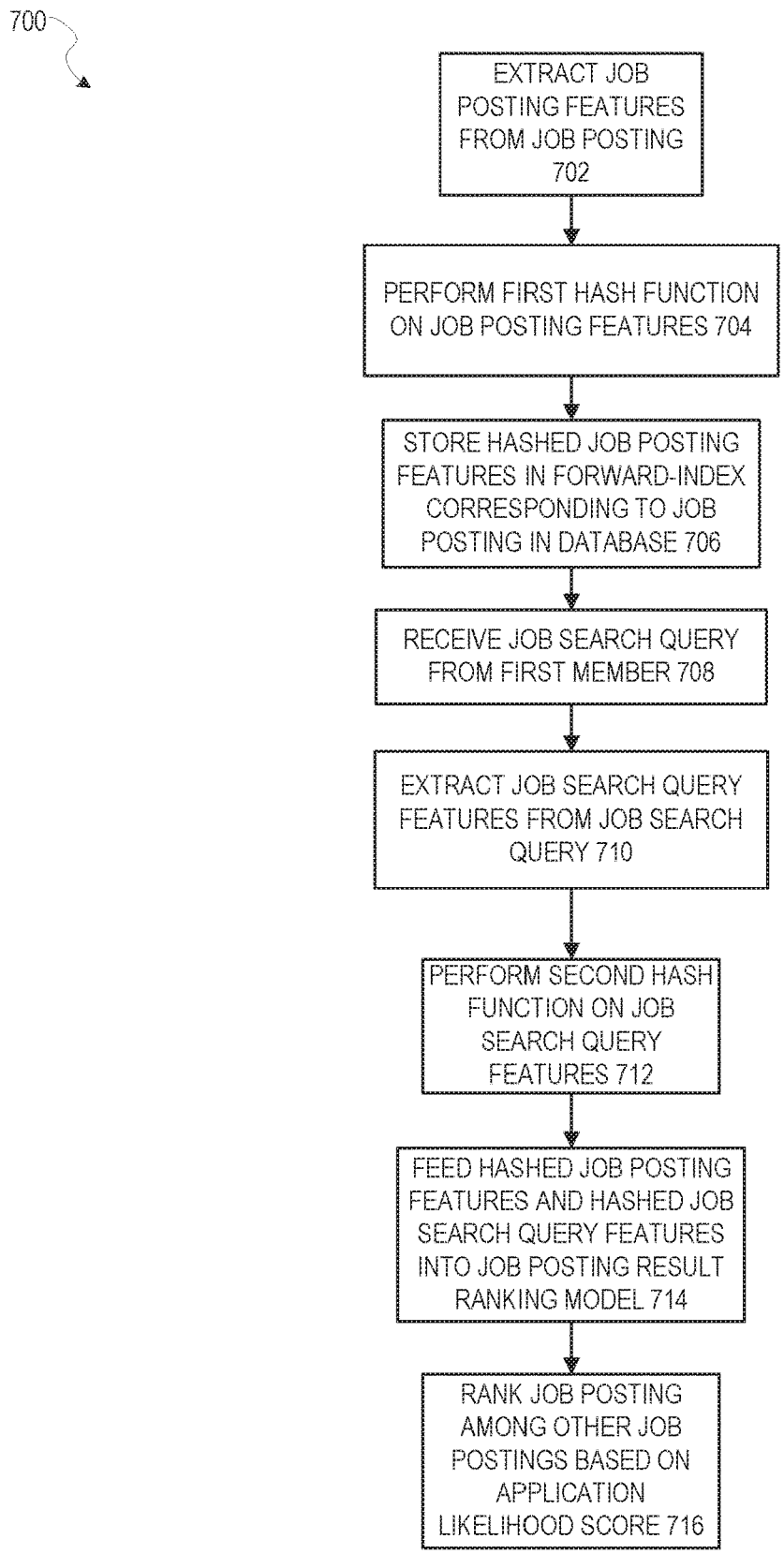
FIG. 7 is a flow diagram illustrating a method to store query features and document features in a computer system, in accordance with an example embodiment.

FIG. 7 is a flow diagram illustrating a method 700 to store query features and document features in a computer system, in accordance with an example embodiment. At operation 702, job posting features are extracted from a job posting stored in a database. At operation 704, a first hash function is performed on to the job posting features to obtain hashed job posting features. At operation 706, the hashed job posting features are stored in a forward-index corresponding to the job posting in the database.

At operation 708, a job search query is received from a first member of a social networking service. At operation 710, job search query features are extracted from the job search query. At operation 712, the second hash function is performed on the job search query features. At operation 714, the hashed job posting features and the hashed job search query features are fed to a job posting result ranking model trained via a machine learning algorithm to compare the hashed job posting features to the hashed job search query features to generate an application likelihood score indicating a likelihood that the first member will apply for a job corresponding to the job posting. At operation 716, the job posting is ranked among other job postings based on the application likelihood score.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-7 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 8:
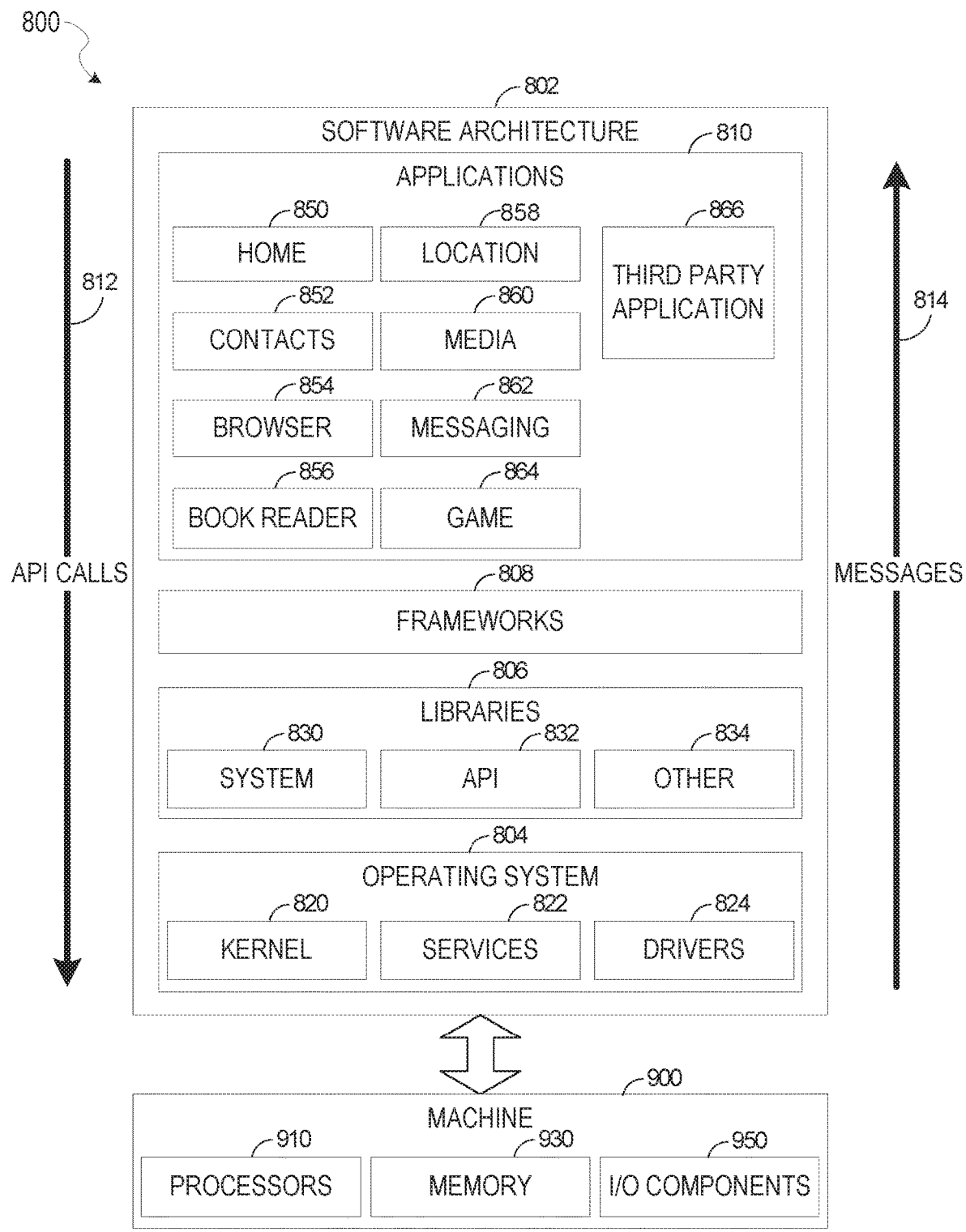
FIG. 8 is a block diagram illustrating a representative software architecture, which may be used in conjunction with various hardware architectures herein described.

FIG. 8 is a block diagram 800 illustrating a representative software architecture 802, which may be used in conjunction with various hardware architectures herein described. FIG. 8 is merely a non-limiting example of a software architecture, and it will be appreciated that many other architectures may be implemented to facilitate the functionality described herein. The software architecture 802 may be executing on hardware such as a machine 900 of FIG. 9 that includes, among other things, processors 910, memory/storage 930, and input/output (I/O) components 950. In the example architecture of FIG. 8, the software architecture 802 may be conceptualized as a stack of layers where each layer provides particular functionality. For example, the software architecture 802 may include layers such as an operating system 804, libraries 806, frameworks/middleware 808, and applications 810. Operationally, the applications 810 and/or other components within the layers may invoke API calls 812 through the software stack and receive responses, returned values, and so forth, illustrated as messages 814, in response to the API calls 812. The layers illustrated are representative in nature and not all software architectures have all layers. For example, some mobile or special-purpose operating systems 804 may not provide a layer of frameworks/middleware 808, while others may provide such a layer. Other software architectures may include additional or different layers.

The operating system 804 may manage hardware resources and provide common services. The operating system 804 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 806 may provide a common infrastructure that may be utilized by the applications 810 and/or other components and/or layers. The libraries 806 typically provide functionality that allows other software modules to perform tasks in an easier fashion than by interfacing directly with the underlying operating system 804 functionality (e.g., kernel 820, services 822, and/or drivers 824). The libraries 806 may include system libraries 830 (e.g., C standard library) that may provide functions such as memory allocation functions, string manipulation functions, mathematical functions, and the like. In addition, the libraries 806 may include API libraries 832 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 806 may also include a wide variety of other libraries 834 to provide many other APIs to the applications 810 and other software components/modules.

The frameworks 808 (also sometimes referred to as middleware) may provide a higher-level common infrastructure that may be utilized by the applications 810 and/or other software components/modules. For example, the frameworks 808 may provide various graphic user interface (GUI) functions, high-level resource management, high-level location services, and so forth. The frameworks 808 may provide a broad spectrum of other APIs that may be utilized by the applications 810 and/or other software components/modules, some of which may be specific to a particular operating system 804 or platform.

The applications 810 include built-in applications 850-864 and/or third-party applications 866. Examples of representative built-in applications 850-864 may include, but are not limited to, a contacts application 852, a browser application 854, a book reader application 856, a location application 858, a media application 860, a messaging application 862, and/or a game application 854. The third-party applications 866 may include any of the built-in applications 850-864 as well as a broad assortment of other applications. In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 866 may invoke the API calls 812 provided by the mobile operating system such as the operating system 804 to facilitate functionality described herein.

The applications 810 may utilize built-in operating system 804 functions (e.g., kernel 820, services 822, and/or drivers 824), libraries 806 (e.g., system libraries 830, API libraries 832, and other libraries 834), and frameworks/middleware 808 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Example Machine Architecture and Machine-Readable Medium

Figure 9:
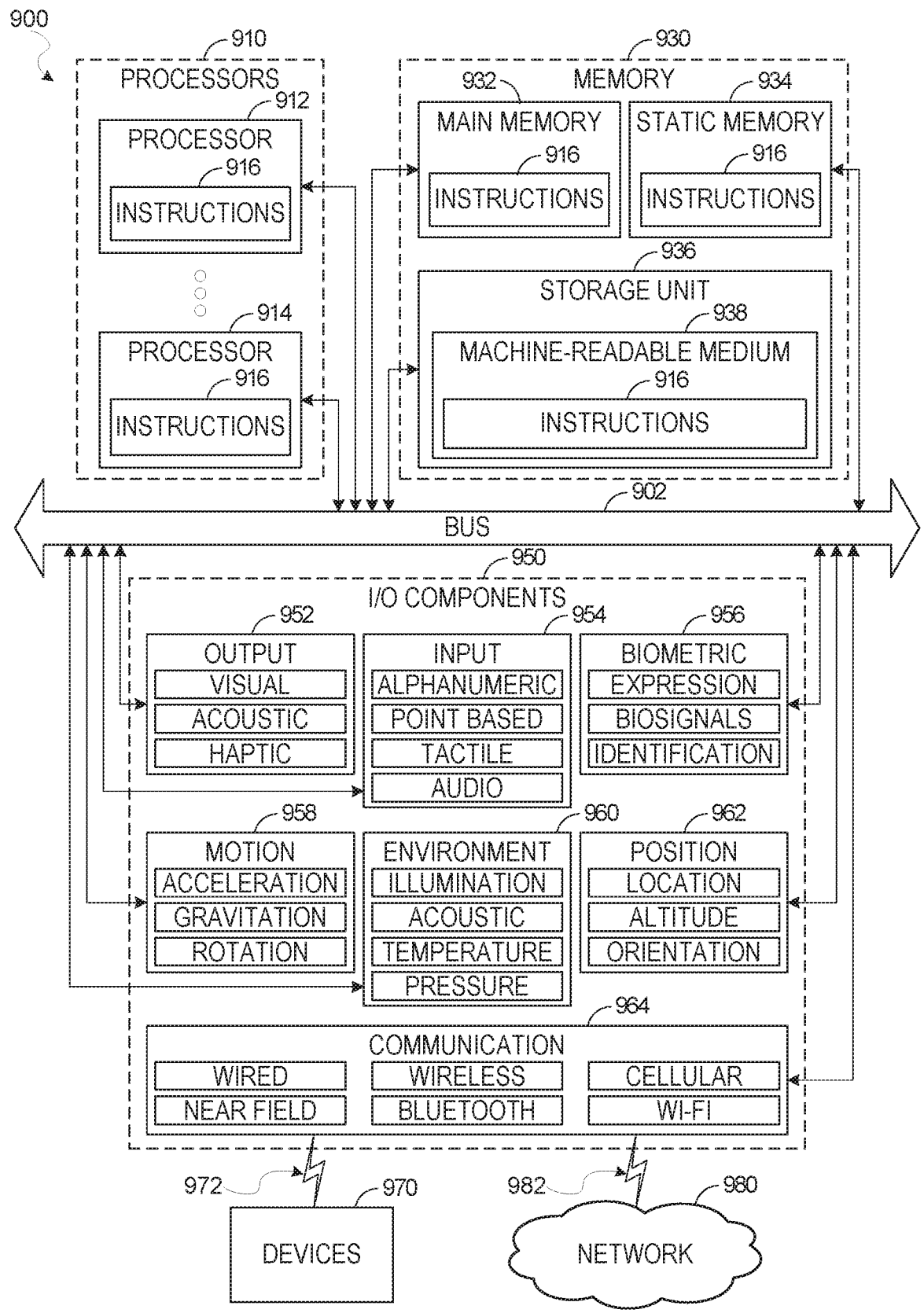
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 808 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein may be executed. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors 912, 914 (sometimes referred to as "cores") that may execute the instructions 916 contemporaneously. Although FIG. 9 shows multiple processors 910, the machine 900 may include a single processor 912 with a single core, a single processor 912 with multiple cores (e.g., a multi-core processor 912), multiple processors 910 with a single core, multiple processors 910 with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the cache memory of processor 912), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions 916 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF47, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched. Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols HTTP). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a computer-readable medium having instructions stored thereon, which, when executed by a processor, cause the system to:
retrieve, using a first feature extractor, from a job posting database, a plurality of forward indexes, each forward index representing a different job posting;
extract, using the first feature extractor, job posting features from a first of the plurality of forward indexes;
perform, using a first hashing component, a first hash function on to the job posting features to obtain hashed job posting features;
insert, using the first hashing component, the hashed job posting features in a posting features field of the first of the plurality of forward indexes;
storing, using the first hashing component, the first of the plurality of forward indexes in the job posting database;
receive, by a search engine, a job search query from a first member of a social networking service;
perform, by the search engine, a search of the job posting database to identify one or more forward indexes of job postings that match the job search query;
extract job search query features from the job search query;
perform a second hash function on the job search query features;
feed the hashed job posting features and the hashed job search query features to a job posting result ranking model trained via a machine learning algorithm to compare the hashed job posting features to the hashed job search query features for the one or more identified forward indexes to generate an application likelihood score indicating a likelihood that the first member will apply for a job corresponding to the job posting; and
rank the job posting among other job postings based on the application likelihood score.

2. The system of claim 1, wherein the first hash function and the second hash function are identical.

3. The system of claim 1, wherein the instructions further cause the system to embed the hashed job search query features in query-coefficient vectors and store the query-coefficient vectors in a second database.

4. The system of claim 1, wherein the job posting result ranking model is a combination of a global ranking model and a query-based model.

5. The system of claim 1, wherein the job posting result ranking model uses logistic regression.

6. The system of claim 1, wherein the job posting result ranking model is optimized via alternating optimization using parallelized coordinate descent.

7. The system of claim 1, wherein the job posting result ranking model is optimized by optimizing for global features and per-feature queries for each query while holding all other variables fixed.

8. A computerized method comprising:
retrieving, using a first feature extractor, from a job posting database, a plurality of forward indexes, each forward index representing a different job posting;
extracting, using the first feature extractor, job posting features from a first of the plurality of forward indexes;
performing, using a first hashing component, a first hash function on to the job posting features to obtain hashed job posting features;

inserting, using the first hashing component, the hashed job posting features in a posting features field of the first of the plurality of forward indexes;

storing, using the first hashing component, the first of the plurality of forward indexes in the job posting database;

receiving, by a search engine, a job search query from a first member of a social networking service;

performing, by the search engine, a search of the job posting database to identify one or more forward indexes of job postings that match the job search query;

extracting job search query features from the job search query;

performing a second hash function on the job search query features;

feeding the hashed job posting features and the hashed job search query features to a job posting result ranking model trained via a machine learning algorithm to compare the hashed job posting features to the hashed job search query features for the one or more identified forward indexes to generate an application likelihood score indicating a likelihood that the first member will apply for a job corresponding to the job posting; and ranking the job posting among other job postings based on the application likelihood score.

9. The method of claim 8, wherein the first hash function and the second hash function are identical.

10. The method of claim 8, further comprising: embedding the hashed job search query features in query-coefficient vectors and storing the query-coefficient vectors in a second database.

11. The method of claim 8, wherein the job posting result ranking model is a combination of a global ranking model and a query-based model.

12. The method of claim 8, wherein the job posting result ranking model uses logistic regression.

13. The method of claim 8, wherein the job posting result ranking model is optimized via alternating optimization using parallelized coordinate descent.

14. The method of claim 8, wherein the job posting result ranking model is optimized by optimizing for global features and per-feature queries for each query while holding all other variables fixed.

15. A non-transitory machine-readable storage medium comprising instructions, which when implemented by one or more machines, cause the one or more machines to perform operations comprising:

retrieving, using a first feature extractor, from a job posting database, a plurality of forward indexes, each forward index representing a different job posting;

extracting, using the first feature extractor, job posting features from a first of the plurality of forward indexes;

performing, using a first hashing component, a first hash function on to the job posting features to obtain hashed job posting features;

inserting, using the first hashing component, the hashed job posting features in a posting features field of the first of the plurality of forward indexes;

storing, using the first hashing component, the first of the plurality of forward indexes in the job posting database;

receiving, by a search engine, a job search query from a first member of a social networking service;

performing, by the search engine, a search of the job posting database to identify one or more forward indexes of job postings that match the job search query;

extracting job search query features from the job search query;

performing a second hash function on the job search query features;

feeding the hashed job posting features and the hashed job search query features to a job posting result ranking model trained via a machine learning algorithm to compare the hashed job posting features to the hashed job search query features for the one or more identified forward indexes to generate an application likelihood score indicating a likelihood that the first member will apply for a job corresponding to the job posting; and ranking the job posting among other job postings based on the application likelihood score.

16. The non-transitory machine-readable storage medium of claim 15, wherein the first hash function and the second hash function are identical.

17. The non-transitory machine-readable storage medium of claim 15, further comprising: embedding the hashed job search query features in query-coefficient vectors and storing the query-coefficient vectors in a second database.

18. The non-transitory machine-readable storage medium of claim 15, wherein the job posting result ranking model is a combination of a global ranking model and a query-based model.

19. The non-transitory machine-readable storage medium of claim 15, wherein the job posting result ranking model uses logistic regression.

20. The non-transitory machine-readable storage medium method of claim 15, wherein the job posting result ranking model is optimized via alternating optimization using parallelized coordinate descent.

* * * * *